(12) United States Patent
Van Amerongen (10) Patent No.: US 9,814,220 B2
(45) Date of Patent: Nov. 14, 2017

(54) AQUARIUM FILTER

(71) Applicant: Jasper Michael Van Amerongen, Den Haag (NL)

(72) Inventor: Jasper Michael Van Amerongen, Den Haag (NL)

( * ) Notice: Subject to any disclaimer, the term of this patent is extended or adjusted under 35 U.S.C. 154(b) by 0 days.

(21) Appl. No.: 14/895,940

(22) PCT Filed: Jun. 4, 2014

(86) PCT No.: PCT/NL2014/050354
§ 371 (c)(1),
(2) Date: Dec. 4, 2015

(87) PCT Pub. No.: WO2014/196857
PCT Pub. Date: Dec. 11, 2014

(65) Prior Publication Data
US 2016/0120156 A1    May 5, 2016

(30) Foreign Application Priority Data

Jun. 4, 2013   (NL) ...................................... 2010914

(51) Int. Cl.
*A01K 63/04*        (2006.01)
*C02F 3/28*         (2006.01)
*C02F 1/00*         (2006.01)
*C02F 103/20*       (2006.01)

(52) U.S. Cl.
CPC .......... *A01K 63/045* (2013.01); *A01K 63/047* (2013.01); *C02F 1/001* (2013.01); *C02F 3/2826* (2013.01); *C02F 2103/20* (2013.01); *C02F 2303/20* (2013.01); *C02F 2307/00* (2013.01)

(58) Field of Classification Search
CPC ..... A01K 63/045; A01K 63/047; C02F 1/001; C02F 3/2826; C02F 2103/20; C02F 2303/20; C02F 2307/00
USPC .......... 210/150, 151, 163, 167.25, 188, 290, 210/416.1, 416.2, 167.22; 119/259, 260
See application file for complete search history.

(56) References Cited

U.S. PATENT DOCUMENTS

| | | |
|---|---|---|
| 3,225,930 A | 12/1965 | Willinger |
| 3,734,853 A | 5/1973 | Horvath |
| 3,957,634 A | 5/1976 | Orensten et al. |
| 4,113,616 A | 9/1978 | Kaes |
| 5,294,335 A * | 3/1994 | Chiang ................ A01K 63/045 119/226 |
| 5,300,225 A | 4/1994 | Fischer |

(Continued)

FOREIGN PATENT DOCUMENTS

| | | |
|---|---|---|
| DE | 100 20 312 A1 | 5/2002 |
| DE | 10 2008 053330 B3 | 4/2010 |

(Continued)

OTHER PUBLICATIONS

Machine-generated English translation of DE 10020312, dated Jan. 11, 2017.*

(Continued)

*Primary Examiner* — Fred Prince
(74) *Attorney, Agent, or Firm* — Young & Thompson (57) ABSTRACT

An aquarium filter consists of a housing with three filter elements including a coarse filter, a fine filter and a porous substrate. A pump provides for the flow of water through the filter, so that only part of the flow passes through the porous substrate.

20 Claims, 6 Drawing Sheets

(56) References Cited

U.S. PATENT DOCUMENTS

| | | |
|---|---|---|
| 5,558,042 A | 9/1996 | Bradley et al. |
| 7,378,026 B1 | 5/2008 | Thompson |
| 2007/0007192 A1 | 1/2007 | Reid |
| 2009/0045143 A1 | 2/2009 | Getsinger |
| 2009/0173284 A1 | 7/2009 | Yoo et al. |

FOREIGN PATENT DOCUMENTS

| | | |
|---|---|---|
| DE | 21 2010 000 003 | 12/2010 |
| EP | 0 484 896 A1 | 5/1992 |
| EP | 2332406 | 6/2001 |
| EP | 2 364 588 A1 | 9/2011 |
| GB | 969847 | 9/1964 |
| WO | 81/02661 A1 | 10/1981 |
| WO | 98-51888 | 11/1998 |

OTHER PUBLICATIONS

International Search Report, dated Sep. 11, 2014, from corresponding PCT application.

\* cited by examiner

AQUARIUM FILTER

BACKGROUND OF THE INVENTION

1. Field of the Invention

The present invention relates to aquarium filter, in particular to aquarium filter provided with a pump. The invention also relates to the use of such a device in combination with a suction attachment for cleaning purposes.

2. Description of the Related Art

An aquarium is a small, closed underwater biotope. At first glance the life in an aquarium consists of fish and plants, but as in every biotope, balance cannot exist in the absence of bacteria. Among other things, bacteria are necessary for processing waste materials in the aquarium and are also called nitrifying bacteria. These bacteria process the waste materials in the aquarium in several steps to form the relatively harmless nitrate. This process is also known as the nitrogen cycle.

The first step consists of the breakdown of large molecules, resulting in the production of molecular ammonium. This is done by bacteria (but not nitrifying ones) that are present in the environment and are not attached to a carrier. They occur floating freely in the water and on the bottom, or fact, wherever waste is present and are known as detritivores.

Simply stated, detritivores break down starches, proteins and fats, in other words they take care of the first breakdown of all the vegetable and animal material. To use more technical terms, they have amylolytic (starch-degrading), proteolytic (protein-splitting) and lipolytic (release of fatty acids from fat storage) activity. Thus they perform the preparatory work for nitrification and make possible further breakdown by the bacteria in the filters. The larger debris is their food, and their waste products are the simplified molecules, such as ammonium/ammonia, which in turn serve as food for the nitrifying bacteria. In contrast to the detritivores, nitrifying bacteria must attach to a carrier. For this reason, the substrate used for filters is very important.

The so-called *nitrosomonas* bacteria are responsible for the second part of the nitrogen cycle. They convert the waste materials in the aquarium from ammonium via ammonia to nitrite, which is harmful even in small quantities. In a well-functioning aquarium the nitrite levels should not rise high too rapidly, since the nitrite is almost immediately converted to the (practically) harmless nitrate (NO3). The latter is done by the so-called *nitrobacter* bacteria. Both of these bacteria are from the aerobic bacteria family. Nitrate is harmful to fish only at very high concentrations of more than 100 mg/l. In the aquarium in general the nitrogen cycle will stop at this point, but in reality the nitrogen cycle is not yet complete. In nature, nitrate is converted into the gases nitrogen (N2) and oxygen (O2). These gases rise out of the water and the nitrogen cycle is then complete. Since the bacteria that perform this last step live under anaerobic conditions, these (anaerobic) bacteria are found at the bottom or in the bed of the aquarium. The bed has the advantage that, here, non-moving, low-oxygen water is present between the gravel pieces. In order to improve the conditions still further, pieces of lava stone (lava granules) may be first place on the bottom and then covered with gravel. The porous structure of the lava stone provides a much larger surface area and the anaerobic bacteria can nestle better into the lava stone. They can also multiply better there than in gravel.

In a newly established aquarium the equilibrium between the above-mentioned *nitrosomonas* and the *nitrobacter* bacteria may not be well-balanced. This is because the *nitrosomonas* bacteria multiply more rapidly than the *nitrobacter* bacteria. If a large amount of waste material suddenly enters the aquarium, not enough *nitrobacter* bacteria will be present to be able to process the nitrite suddenly formed in the aquarium, and thus nitrite problems will occur. Table 1 below shows what a certain nitrite value means for the aquarium.

TABLE 1

| Nitrite value (in mg/l) | Significance for the aquarium |
| --- | --- |
| <0.1 | Causes no problems in the aquarium |
| 0.2 | Nitrite value is toxic for the fish |
| 0.5 | Nitrite value is a cause for concern |
| 2.0 | Lethal for fish |

Although strictly speaking a nitrite value of 2.0 mg/l is lethal to fish, a lower value can also cause death of fish. This is because a nitrite value of 0.2 mg/l or higher is already toxic for fish. As a result, the fish will become more susceptible to diseases and thus die indirectly as a result of the nitrite. Likewise the sensitivity to nitrite differs according to the fish species. Thus the values above cannot be regarded as definite values.

A number of measures that can help manage the nitrite content in the aquarium include:

Feeding in moderation. The food that is not consumed will rot in the aquarium and thus can result in excessively high nitrogen contents.

Provision of a good filter. A good filter can ensure that the nitrite content does not become too high. Specifically, a large number of bacteria deposit quickly on the substrate in the filter, since a lot of food is present here and also a lot of oxygen. A good interior filter within the aquarium may be adequate for an aquarium that is not too large. An external filter can have a larger filter volume and it is often easier to change the types of substrate to one on which bacteria more readily settle.

Plants ensure rapid stabilization of the aquarium. Therefore it is sensible to plant a number of strong, healthy growing plants in the aquarium. Bacteria also attach to plants, and plants are naturally also appealing to the eye.

Commercially available bacteria may be added to the water. Various agents containing suitable bacteria can be purchased for use in setting up a new aquarium.

Changing too much water at once can lose part of the bacterial culture. Therefore it is not good to replace too much water or replace it too frequently. To reduce the quantity of waste materials, weekly replacement of a maximum of ¼ of the aquarium water is advisable. But this should definitely not be done more than once a week. After starting a new aquarium one should wait at least about 3 weeks before changing the water for the first time so as not to interfere with the growth of bacteria.

Avoid too many fish in the aquarium, since the more fish are in the aquarium, the more waste materials will enter the aquarium. A densely populated aquarium will develop a nitrite problem sooner than a sparsely populated one.

The bacterial count depends on the food supply. Thus when many fish are simultaneously released into an aquarium, initially there will be a shortage of *nitrobacter* bacteria to process the suddenly large supply of waste, and there is a great chance of a high nitrite value.

By placing fish in the aquarium progressively the bacterial colony can be allowed to grow gradually and the formation of nitrite will be prevented.

Despite taking these precautions, maintaining a healthy aquarium is difficult and requires considerable care and attention. Water and bottom fouling of the aquarium requires considerable effort to keep clean. Especially bottom fouling is inconvenient, since it requires direct attention e.g. using a suction/vacuum attachment. A particular burden is the need for regular cleaning of the conventional cartridge filter, which is necessary since otherwise water values may begin to vary after 6 to 8 weeks. Stinking detritus consisting of accumulating fish faeces, sludge, leftover food and plant residues will be familiar to anyone that has performed this task. The result is almost always floating debris that drifts around in the water in the aquarium and greatly reduces viewing pleasure. With a cichlid aquarium the experienced aquarist understands that the debris levels will be somewhat higher than in other aquaria and it can be necessary to changes 25/30% of the water per week to keep the aquarium clean and clear.

It would be desirable to provide a filter that was able to overcome at least some of the above-mentioned inconveniences.

BRIEF SUMMARY OF THE INVENTION

According to the invention there is provided an aquarium filter comprising: a watertight filter housing containing a first coarse filter substrate, a second fine filter substrate and a third porous substrate; a filter inlet connected to the filter housing to deliver aquarium water to the housing; a filter outlet connected to the filter housing to transport filtered water from the housing to the aquarium, and a pump arranged in use to circulate water from the filter inlet, through the first coarse filter and the second fine filter to the outlet, whereby the third porous substrate is arranged such that only a partial flow of water passing through the first and second filter substrates flows through the third porous substrate.

For effective operation, the flow speed through a filter must be carefully regulated. In filters where the flow speed is too high, the bacteria will have little chance of attaching. Filters with too slow a flow do not provide sufficient oxygen supply. This results in a low bacterial population, since without this they cannot grow. According to an important aspect of the present invention, two different flow speeds are created within the filter housing. This ensures a higher flow speed through the coarse and fine filters and thus a very high filtering capacity. However, a low flow speed partial flow is also present through the porous filter substrate, so that the bacteria can do their work well and a climate results in which a good, healthy bacterial population can grow. Furthermore, a climate develops where they cannot be washed away, due to the low flow speed. As a result of these characteristics far less maintenance work is required and the biological equilibrium of the aquarium remains very stable and the water very clear.

Preferably, the filter has an inlet in fluid communication with a pump inlet chamber and the pump inlet chamber has primary openings exposed to the second filter substrate and secondary openings exposed to the third porous substrate. In one embodiment, in order to achieve the desired flow distribution, a flow cross section of the primary openings is greater than a flow cross-section of the secondary openings.

The pump may be located at any appropriate location in the circuit. In one embodiment, the pump has an outlet connected to the filter outlet. In a most preferred embodiment, the pump is located within the pump inlet chamber. In such an embodiment, the housing may comprise a lower zone in which the third porous substrate and the pump inlet chamber are located, a middle zone in which the second fine filter is located and an upper zone in which the first coarse filter is located. Preferably, the fine filter material may cover both the pump inlet chamber and the third porous substrate.

In an embodiment, the pump inlet chamber may be located centrally in the lower zone and surrounded by the third porous substrate, wherein the primary openings are located at an upper side of the pump inlet chamber and the secondary openings are located at a lower side of the pump inlet chamber. Such a configuration is believed to be particularly convenient in providing regions of very low flow rate where bacteria can nestle.

The first coarse filter may be have relatively larger cross-sectional area than the filter inlet and the housing may further comprise a header space for distributing flow from the filter inlet over the first coarse filter. There may also be provided a mat or grill for assisting this distribution.

The first coarse filter may be sized to remove all particles larger than 5 mm, preferably all particles larger than 2 mm. It may be a relatively conventional filter block or mat, frequently referred to as blue filter material. It may comprise nylon or similar plastic material, preferably having a thickness of at least 1 cm, more preferably 3 cm or even as much as 5 cm or more. It may be present as a single filter grade or it may also be present in a number of different filter grades, tending from coarse to less coarse. The coarse filter helps purify the water by retaining the coarse pieces of debris, but by means of a biofilm (biological skin) which forms on the filter mats they also provide a home for the billions of bacteria which in turn break down the harmful waste materials such as nitrite or nitrate. The sludge-degrading bacteria also nestle in large numbers in the coarse filter mats, breaking down the coarse debris particles such as leaves of plants (organic debris).

Little or no maintenance is required for coarse filter mats. If too much organic debris accumulates over time, so that the mats become clogged and do not allow as much water through, it is advisable to rinse the mats with aquarium water The second fine filter may be sized to remove all particles greater than 0.5 mm, preferably all particles greater than 0.1 mm and may comprise wadding, preferably of synthetic material and preferably having a thickness of at least 1 cm. As a result of the very fine structure, even the very finest debris particles are filtered out of the water. Sludge-degrading bacteria will nestle therein and break down the sludge/organic debris. However, their most important function is debris filtration. Such filter wadding cannot usually be truly washed clean, and replacement may be necessary.

The third porous substrate may be any conventional porous substrate capable of retaining bacteria in its pores. Preferably it comprises a porous stone, such as lava stone or the like. It preferably has a depth of at least 4 cm. The exceptionally porous surfaces of lava granules offer optimal conditions for the colonization of nitrifying bacteria. They are ideal for use in filter housings for fresh water and seawater aquaria. In this context, it is important to note that the third porous substrate is not generally a filter i.e. it is not intended to remove particulates. It may be composed of relatively large elements.

The effective surface area of the porous substrate is of determining significance for the biologic functioning of the filter. The larger the effective surface area, the more bacteria can be received. Many materials have a large surface area, but the pores are closed from the outside. Thus they cannot be reached by bacteria. The surface area of all accessible pores plus the external surface area is known as the effective biological surface area. The structure of the material also determines the capacity. Thus bacteria make special demands on the pore size. Pores of insufficient size will get clogged, while bacteria contained in excessively large pores will wash away. Without wishing to be bound by theory, it is believed that the best material is the material with the largest number of pores of 75 to 150 microns in size, wherein the pores should have an open cellular structure. A good material can be recognized from its light weight in the dry state. Lava stone, for example, is a natural product with particularly good biological properties. Chemically neutral materials (which do not add anything to or subtract anything from the water) in practice have the longest useful lives. It is necessary to consider the fact that in conventional aerobic filters a biofilm (biological skin) can deposit on the filter material and clog the pores. In other words, such biological filters may also need to be partially cleaned from time to time. The average is once per half-year although this can differ depending on the aquarium. It need not necessarily happen that the pores become clogged, but if that seems to be happening, it should be tested with an NO2 test. If the nitrite content increases, it can be assumed that the pores are clogged, as long as other chemicals have not been used in the aquarium. In that case, extensive cleaning may be desirable.

In the configuration as presently claimed, the pores of the lava granules do not become clogged with sludge. No sludge can enter, since it is filtered out of the water by the white filter wadding and the debris is broken down there. Observations have also not detected a biological skin developing on the lava stone.

The filter may be provided in various sizes. For domestic aquaria, the housing preferably has a flow through area of between 100 cm$^2$ and 4000 cm$^2$, preferably around 300 Cm$^2$.

According to a further embodiment, the filter may comprise an air vent arranged to allow air to be purged from within the housing. This is particularly useful in the case that other components, such as a vacuum attachment are to be connected or removed. Various conventional air vents may be used including manually operated cocks and automatic vents having hydrophobic filters or the like.

According to a most important aspect of the invention, at least the filter inlet has a releasable connector and the filter further comprises a cleaning attachment that can be selectively connected to the releasable connector for cleaning the aquarium. As a consequence of the present construction, the filter system may operate through the cleaning attachment to aspirate waste and debris from within the aquarium by hand. Because of the well established biological state of the filter, it is able to deal with the large influx of such waste, which is quickly and effectively broken down in the coarse filter. The relatively large flow rate through the first and second filter substrates ensures effective cleaning while avoiding that the porous filter is disturbed.

According to a still further embodiment, the filter inlet and/or filter outlet may be provided with stopcocks. This is particularly convenient for use in connecting and disconnecting a cleaning attachment. It will also be understood that the cleaning attachment may be kept permanently connected and a user may switch between different inlets to the filter.

The exact flow conditions through the filter will vary from case to case according to the required configuration and operating conditions. In one embodiment, the filter may be arranged that in use, at least 60% of the flow bypasses the third porous substrate, whereby nitrifying bacteria colonising the third porous substrate are not washed away.

As also discussed, the filter may be provided in different capacities. Preferably, the pump is rated to operate at more than 500 liters per hour for a head of 1 m, more preferably at more than 750 liters per hour.

According to an alternative embodiment, the filter may further comprise an anaerobic filter chamber having an anaerobic inlet to receive a supply of relatively oxygen poor water from the aquarium at least partially in parallel to a supply of relatively oxygen rich water to the filter inlet and an anaerobic outlet in fluid connection to the pump such that the oxygen poor water is drawn through the anaerobic filter chamber and subsequently mixed with the oxygen rich water. As discussed above, the aerobic bacteria present within the filter and particularly on the first, second and third substrates, are only capable of partly completing the nitrogen cycle by breaking down waste products to form nitrates. In order to complete the cycle, the nitrates must be further broken down in an anaerobic process by anaerobic bacteria. By providing an additional chamber in which such cultures may thrive and by supplying oxygen poor water from the bed of the aquarium, the filter can also at last partially perform this important function. The anaerobic filter chamber may be located at any convenient location within the filter housing and may even be located outside the filter housing as a separate compartment. Preferably, the water is drawn from a small bore tube having multiple openings arranged under the bed of the aquarium and connected to the anaerobic inlet. The small bore tube may be branched and the openings may be sized to ensure a regular flow from over the whole of the bed. The size of the bore may also be selected in relation to the size of the filter inlet to ensure that a relative flow through the anaerobic inlet is lower than a flow through the filter inlet. An additional flow regulator or valve may be provided to regulate one flow with respect to the other.

In one embodiment, the anaerobic outlet may connect directly or via a valve, with the header chamber. In this case, the anaerobically treated water will pass through the aerobic filter too. In an alternative, the anaerobic outlet may be downstream of the aerobic filter and may be connected to the pump inlet chamber. In a further alternative, the anaerobic outlet may be connected at the filter outlet e.g. using a venturi.

According to a further embodiment, the anaerobic filter chamber may be provided with an additional vent. A correctly operating bacterial system within the anaerobic filter chamber will convert nitrates in the water into nitrogen gas, which will be evolved and must be allowed to escape. The additional vent may be automatic, e.g. in the form of a hydrophobic filter or may be provided with a stop-cock allowing the collected gas to be let-off as desired. The additional vent may also be combined with the vent from the filter housing.

The anaerobic filter chamber may be provided with any appropriate filter substrate on which the anaerobic bacteria can propagate. Preferably, this comprises porous filter material having a large surface area such as lava stone or gravel, most preferably having sizes in the range from 0.5 mm to 1.5 mm.

The invention also relates to a method of operating a filter for an aquarium as described herein.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
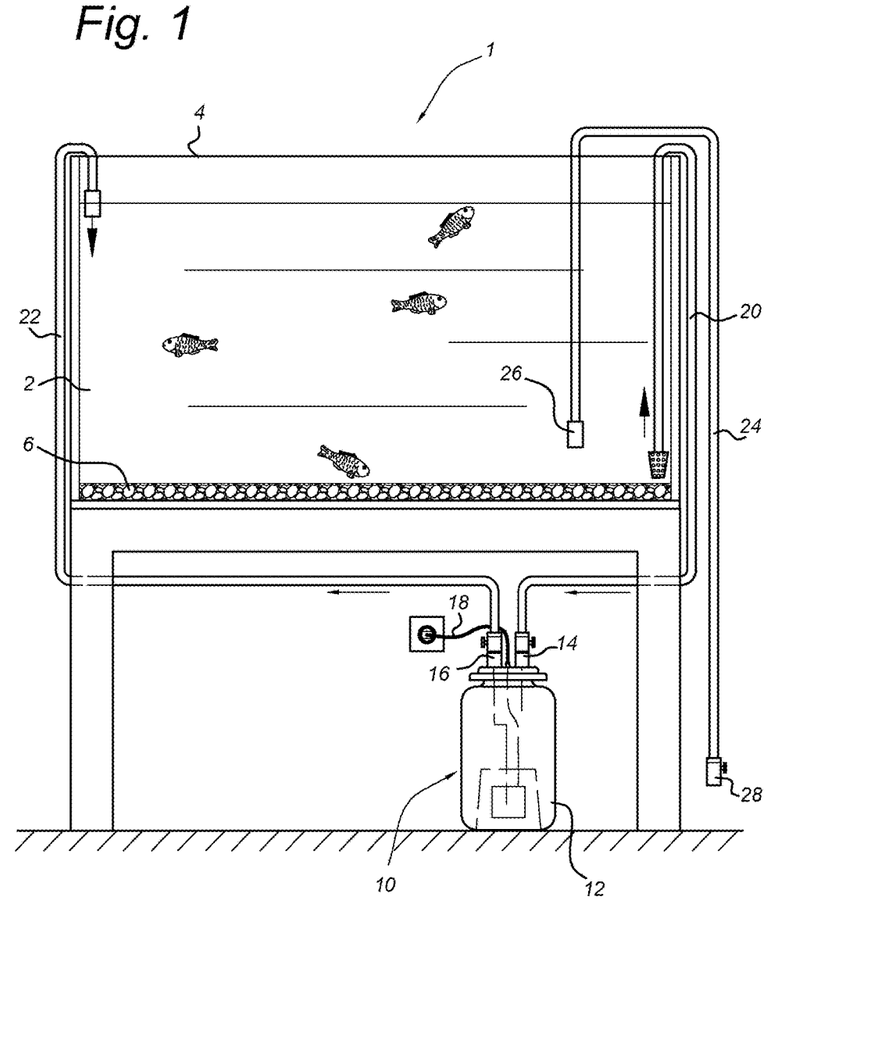
FIG. 1 shows an aquarium and filter according to a first embodiment of the present invention.

FIG. 1 shows a schematic view of an aquarium 1 in which a filter 10 according to the invention is installed. The filter 10 comprises a watertight filter housing 12 having a filter inlet 14, a filter outlet 16 and a power inlet 18 which connects to a domestic electricity supply. The filter inlet 14 is connected to inlet tubing 20 from the bottom 2 of the aquarium 1 and the filter outlet 16 is connected to return tubing 22 which delivers filtered water back to the top 4 of the aquarium 1. The inlet and return tubing 20, 22 may be conventional tubing forming part of an existing aquarium. Additionally there is shown a cleaning attachment 24 having an aspiration head 26 and an aspiration coupling 28. The aspiration head may be telescopic allowing easier access to all parts of the aquarium and will be described further below.

Figure 2:
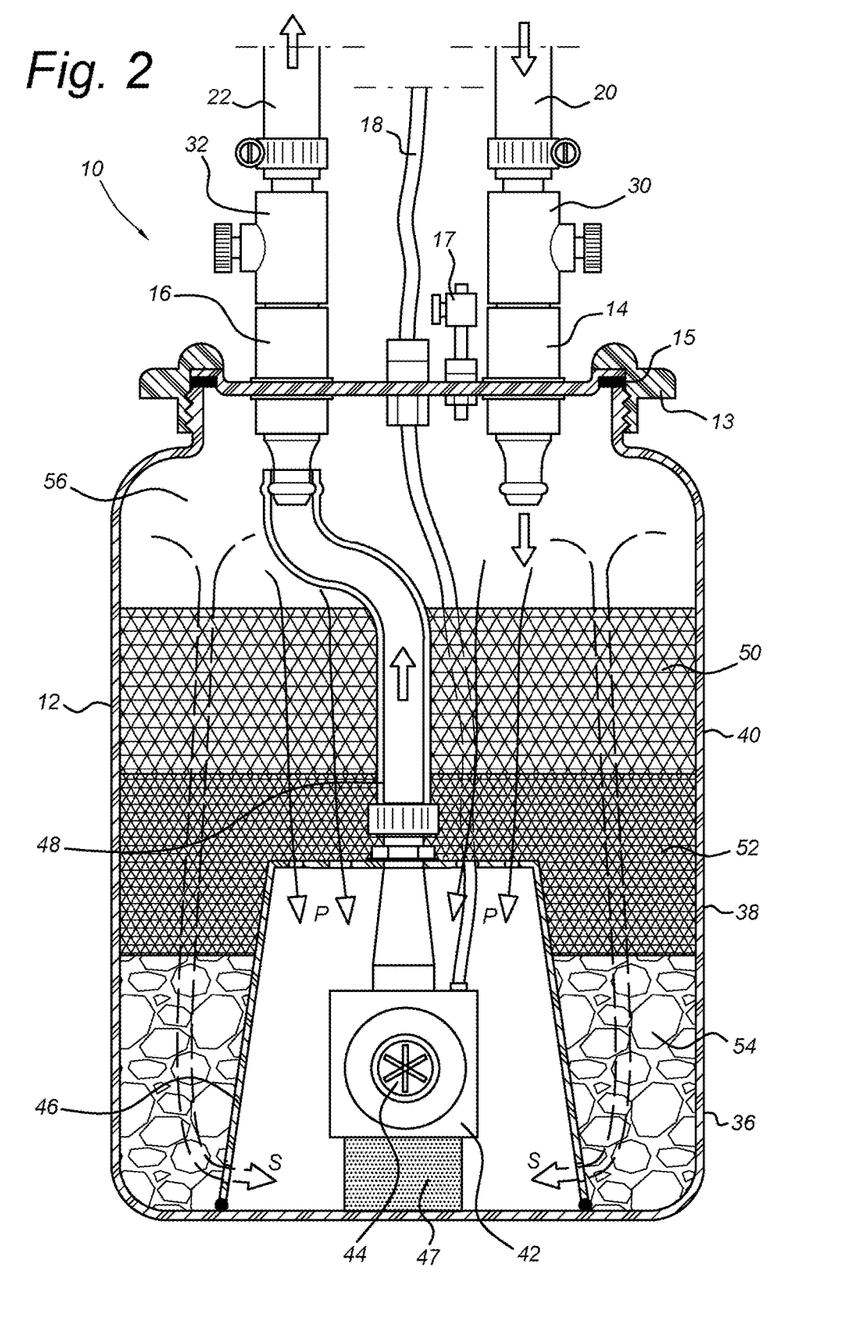
FIG. 2 shows a schematic cross-section through the filter of FIG. 1.

FIG. 2 shows a schematic cross-sectional view through the filter 10 of FIG. 1 indicating the principle components of the invention. The filter housing 12 is provided with a cover 13 which engages via a seal 15 to ensure that the filter housing 12 is watertight. The cover 13 also carries the filter inlet 14, the filter outlet 16, a manually operable air vent 17 and allows passage of the power inlet 18. The inlet tubing 20 is connected to the filter inlet 14 by an inlet coupling 30, while the return tubing 22 is connected to the filter outlet 16 by an outlet coupling 32. Although any form of appropriate connector may be used, preferably Gardena™ 2976 hose couplings with adjustable shut-off cocks are used for the inlet coupling 30, outlet coupling 32 and aspiration coupling 28.

The housing 12 is divided into a lower zone 36, a middle zone 38 and an upper zone 40. A pump 42 having a pump inlet 44 is located in the lower zone 36 within a pump inlet chamber 46. A pump outlet 48 is connected to the filter outlet 16. Within the housing 12 are provided three different forms of filter substrate. A first coarse filter substrate 50 is located in the upper zone 40. A second fine filter substrate 52 is located in the middle zone 38 and a third porous substrate 54 is located in the lower zone in the area surrounding the pump inlet chamber 46. Above the coarse filter substrate 50 is a header space 56 into which the filter inlet 14 opens.

In the illustrated embodiment, the first coarse filter substrate 50 is blue nylon mat having a thickness of around 5 cm and pore sizes of around 2-5 mm. The skilled person will recognise that other similar forms of coarse filter may also be used. The second fine filter 52 was made up of six layers of fine white filter wadding with a total thickness of around 7 cm. This was considered a sufficient thickness of wadding to ensure that all particulate and sedimentation would be removed from the circulating flow. For the third porous substrate 54, lava granules with a particle size of 1 cm to 3 cm were used. This is a compromise between flow speed and surface area. As previously stated, aerobic filters consume a great deal of oxygen and the bacteria must therefore be assured of a constant supply of oxygen. The use of coarser lava granules increases the flow speed, so that more gas can be exchanged and more oxygen becomes available in the filter. Smaller lava granules, in contrast to the coarser ones, result in a lower flow speed, thus less oxygen in the filter. Smaller granules however have a far larger surface area for the adhesion of bacteria.

Figure 3:
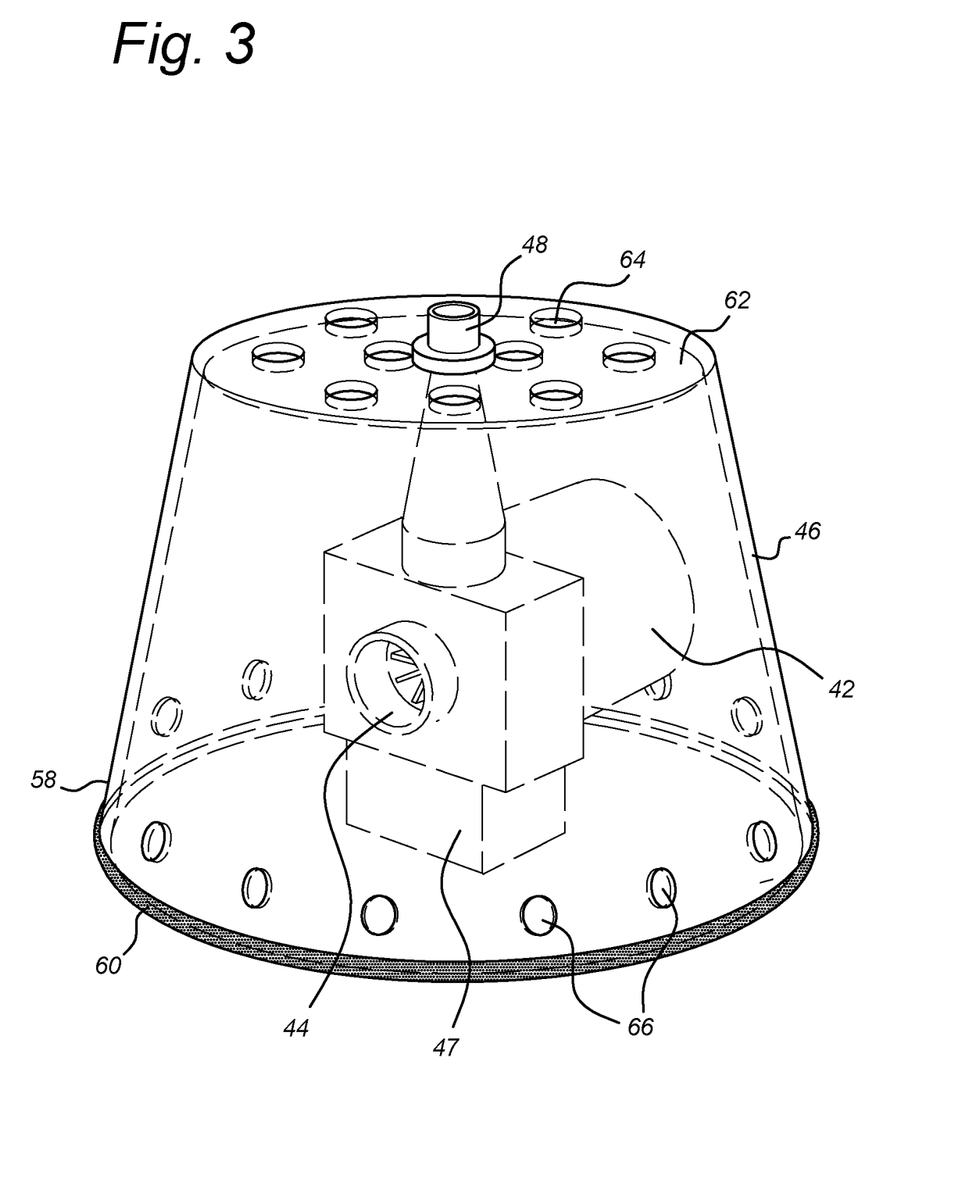
FIG. 3 shows a perspective view of the pump inlet chamber.

FIG. 3 shows in more detail a perspective view of the pump 42 and pump inlet chamber 46. The pump inlet chamber 46 is in the form of an inverted truncated cone having a lower side 58 which seals against the base of the housing 12 by virtue of a rubber gasket 60. The pump 42 is suspended from a partially closed upper side 62 of the pump inlet chamber 46 by the pump outlet 48 and is isolated from the base of the housing by a rubber block 47. This suspension of the pump 44 and the gasket 60 between the pump inlet chamber 46 and the housing 12 ensures relatively silent operation of the pump 44 since vibrations are attenuated.

The pump inlet chamber 46 has a number of primary openings 64 on its upper side 62 and a number of secondary openings 66 around its lower side 58 adjacent to the gasket 60. The total flow cross section of the primary openings 64 is greater than the total flow cross-section of the secondary openings 66. As a result of this difference in cross-section, operation of the pump 42 as explained further below causes a greater rate of flow through the primary openings 64 than through the secondary openings 66. It will also be noticed that due to their relative positions, the primary openings 64 are exposed to the second filter substrate 52 while the secondary openings 66 are exposed to the third porous substrate 54. The secondary openings may also vary in size according to their position around the lower side 58 in order to ensure homogenous aspiration over the circumference.

In use, and with reference to FIG. 2, the filter 10 operates as follows. When the pump 42 is actuated, water enters through the filter inlet 14 into the header space 56. It then spreads out across the coarse filter substrate 50 so that the water and any debris present are well-distributed. The water then flows through the white filter wadding 52, where even the very finest sludge particles are filtered out. Due to the different relative flow areas of the primary openings 64 and the secondary openings 66, a majority of the flow P is directed centrally towards the upper side 62 of the pump inlet chamber 46. A lower speed secondary flow S passes through the third porous substrate 54. Here, the bacteria have plenty of time to help clean the water as a result of the low flow speed. As previously stated, the high flow speed P through the first and second filter substrates 50, 52 ensures that the debris is filtered out to maintain a crystal clear aquarium.

This high flow speed may also be used for vacuum cleaning the bottom of the aquarium 1. In order to do this, the inlet coupling 30 is closed, while the pump 42 continues to operate. Now the vent 17 may be opened allowing air into the filter housing 12 whereby the water level in the cartridge filter will gradually become lower. After 5 seconds the vent 17 device may be closed again. Now the water level has dropped by 2 to 3 cm and the stopcock of the outlet coupling 32 may be closed. At this point, the input coupling 30 can be removed and exchanged for the aspiration coupling 28. With the aspiration head 26 in the aquarium 1, the stopcock of the outlet coupling 32 can be opened again and aspiration of water from the aquarium 1 through the aspiration head 26 can proceed. Once cleaning is finished, the above steps can be repeated in reverse order to reconnect the inlet coupling 30. As a result of the present filter principle a high pump capacity may be used, without disturbing the biological condition of the filter. Much less debris is left behind than in the case of traditional filter systems, and even less maintenance is required.

Before use and if necessary before vacuum cleaning, the filter 10 should be purged of air. This is carried out by closing the outlet coupling 32 and slightly opening the vent 17 during operation of the pump 42. As a result of the pressure that now develops, air will be forced out via the vent 17. By gently moving the filter housing 12 back and forth all air can escape. As soon as there is no air remaining, the vent 17 may be closed again and the outlet coupling 32 opened.

The filter according to the invention requires minimal cleaning. In contrast to mechanical filters, the claimed biological filter system is not designed for collecting sludge but instead for housing bacterial cultures. Therefore the filter is only cleaned occasionally and when doing so, not all of the filter material is replaced at once but only a small portion at intervals. This prevents losing all the beneficial bacteria at once, as would happen in the case of a complete filter cleaning. If for any reason bacterial culture is lost (for example after use of medication), the filter must be cultured again. This may be done using brands of commercial bacteria. The effectiveness of a biological filter can be easily checked based on measurements of ammonium/ammonia, nitrite and nitrate, at least as far as the activity of aerobic bacteria is concerned. This can best be measured in the effluent from the filter. In the filter of the present invention only the first two layers of the white fine filter wadding need replacing, since the good bacteria are located in the other filter material. In principle the lava granules do not become dirty, and the blue filter mat is easy to rinse with aquarium water so as not to kill the bacteria on the blue filter mat. The white filter wadding and the blue filter mat serve as traps for debris and sludge during vacuum cleaning of the bottom of the aquarium. This debris and sludge thus serve as an extra source of food for the bacteria which is in turn broken down by sludge-degrading bacteria (detritivores) as described above.

As discussed above, nitrate is the end product of the nitrogen cycle and this is toxic only in quantities of more than 100 mg/l. In nature, nitrate will be converted into the gases nitrogen ($N_2$) and oxygen ($O_2$) which are released to atmosphere. Since the bacteria that provide this final step live in anaerobic conditions, these (anaerobic) bacteria will be present in the bottom or bed of the aquarium where non-moving water of low oxygen content is present between the gravel particles. Since there is little circulation there, this process does not occur quickly, and the nitrate content can build up more quickly than it is broken down. As a result, high concentrations of nitrates can arise, resulting in accelerated fouling of the water, as well as stress on the fish with all of its consequences (disease). Plants can only take up a certain amount of nitrate and the rest of the nitrate is excess. Ideally, low nitrate content, with a value of 12.5 mg/l to a maximum of 25 mg/l is preferred. The fish prefer this and there is still enough nitrate as a food source for plants. This may be achieved by regularly replacing some water (once or twice a month), but it can also be accomplished by commercial products such as NitrateMinus™ granules from Tetra. These granules are indicated to have a biological activity that breaks down the nitrate to nitrogen ($N_2$) and oxygen ($O_2$). The granules are effective for about 12 months and must be replaced once measurements indicate an increase in nitrate content in the water.

The presently claimed and described filter has been extensively tested for over 18 months in a large, well-stocked, indoor cichlid aquarium of 300 liters. The pump and filter have operated continuously without requiring cleaning. Periodic inspections have shown the coarse and fine filter substrates to be free of detritus. The above mentioned NitrateMinus™ granules from Tetra have been used to maintain low nitrate levels. No water has been changed during a period of 12 months and the nitrite and nitrate levels have remained stable throughout the period.

In a further test, the same filter (biologically stabilised) was installed in a tank with four turtles at Blijdorp Zoo in Rotterdam. The tank had a volume of 250 liters and the loading was around 4 g of nitrogen per week. The test proceeded for a period of 4 weeks from 7 Feb. to 3 Mar. 2014 and during this time around 10 liters of water was topped-up and no further water change occurred. The water was monitored for total dissolved solids (TDS), ammonia ($NH_3$), nitrite ($NO_2$), nitrate ($NO_3$), acidity (pH) and carbonate hardness (KHd). The filter continued to work well and the measured values corresponded to those expected. On $3^{rd}$ March, high $NH_3$ and $NO_2$ values were measured, which appeared to correlate with food that had been left uneaten in the tank. At this point, the tank was cleaned and the test was discontinued.

TABLE 2

| TDS mg/l | NH3—N mg/l | NO2—N mg/l | NO3—N mg/l | pH | KH ° d |
|---|---|---|---|---|---|
| 296 | 0 | 0.049 | 17 | 8.11 | |
| 310 | 0 | 0.031 | 18.4 | 7.73 | |
| 315 | 0 | 0.127 | 19.4 | 7.54 | 3.72 |
| 315 | 0 | 0.081 | 22.5 | 7.38 | 3.584 |
| 344 | 0 | 0.018 | 27 | 7.26 | 2.996 |
| 350 | 0 | 0.051 | 27.5 | 7.49 | 3 |
| 352 | 0 | 0.013 | 29 | 7.56 | 2.996 |
| 354 | 0 | 0.069 | 30 | 7.73 | 2.94 |
| 381 | 1.5 | 0.554 | 34.5 | 7.27 | 2.548 |

Figure 4:
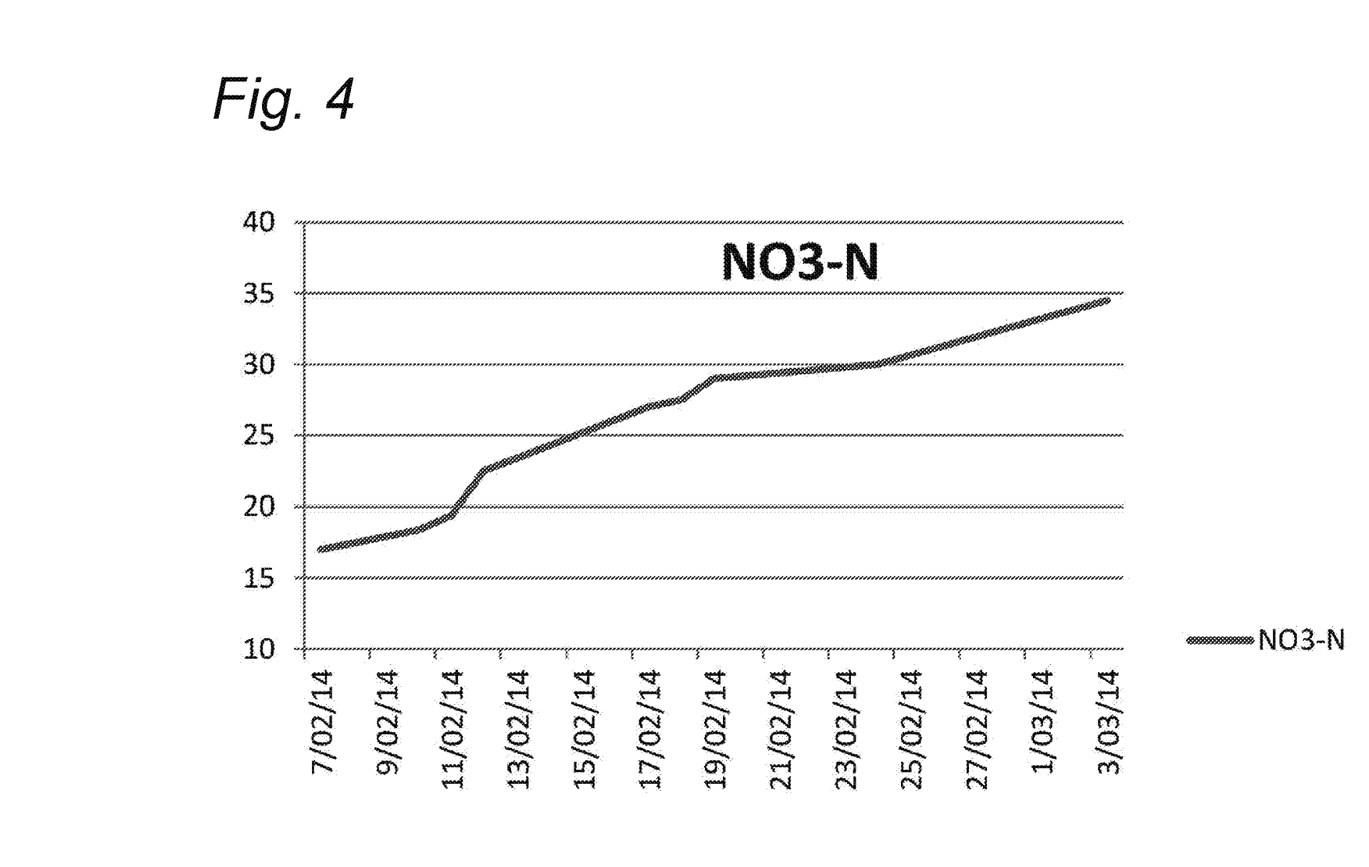
FIG. 4 shows a graph of the nitrate variation during a four week testing period.

The results are shown in Table 2, whence it may be noted that ammonia values were stable until the final reading on $3^{rd}$ March and that nitrite levels were also low until that date. The values for nitrate are represented graphically in FIG. 4, showing that there has been a steady increase throughout the test period which indicates that the nitrogen cycle has been proceeding correctly in breaking down the waste products of the turtles to nitrate.

Figure 5:
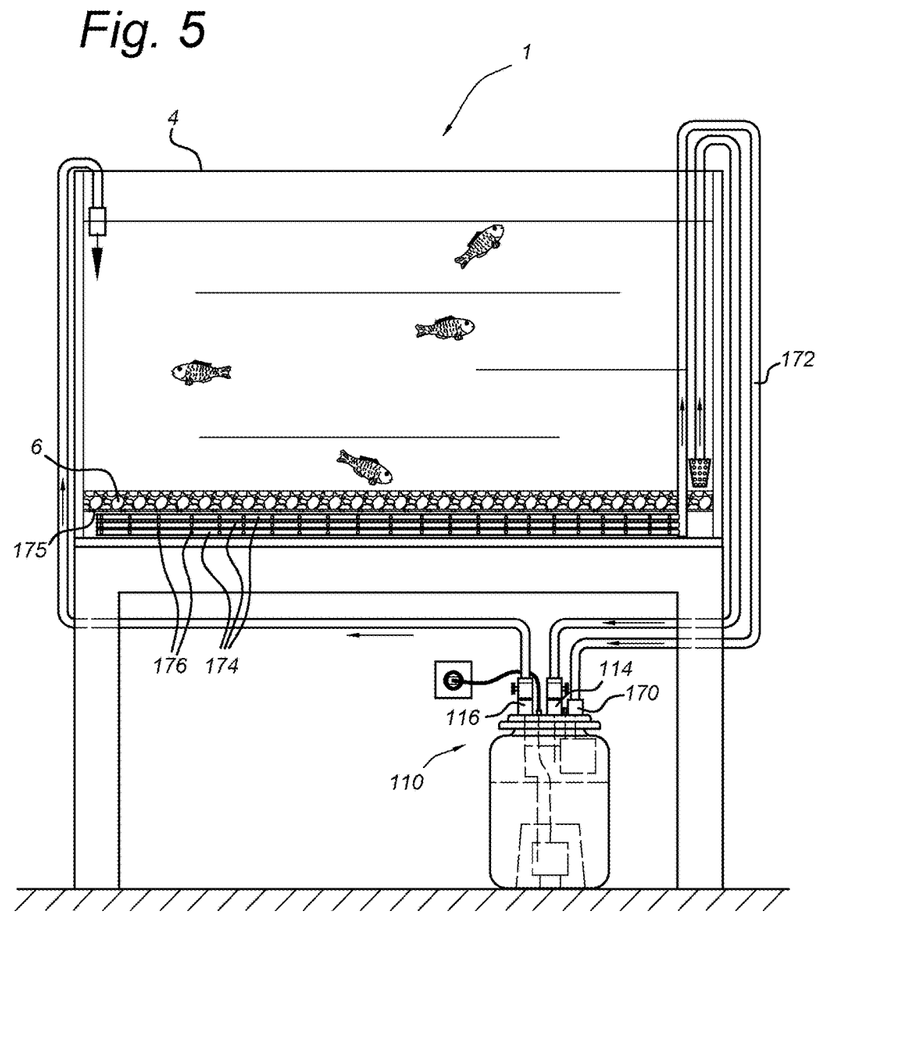
FIG. 5 shows a filter according to a second embodiment of the invention.

A second embodiment of the invention is shown in FIG. 5, in which like elements to those of the first embodiment are referenced with the same reference numerals preceded by 100.

According to the second embodiment, a filter 110 is provided with additional anaerobic capacity such that nitrates in the aquarium 1 may also be broken down and converted to nitrogen. The filter housing 112 has an additional anaerobic inlet 170, which is connected to a small bore tube 172, which is located under the bed 6 of the aquarium 1. This is a region that is already relatively low in oxygen. The small bore tube 172 has branches 174 and a plurality of apertures 176 in the branches 174. These are arranged beneath an aperture plate 175, which prevent the apertures becoming blocked with gravel and sand. Alternatively, the small bore tube 172 may be embedded in the bed 6. As will be described further below, the anaerobic inlet 170 is arranged to receive a supply of relatively oxygen poor water from the aquarium bed 6 at least partially in parallel to the supply of more oxygen rich water through the inlet tubing 120 to the filter inlet 114.

Figure 6:
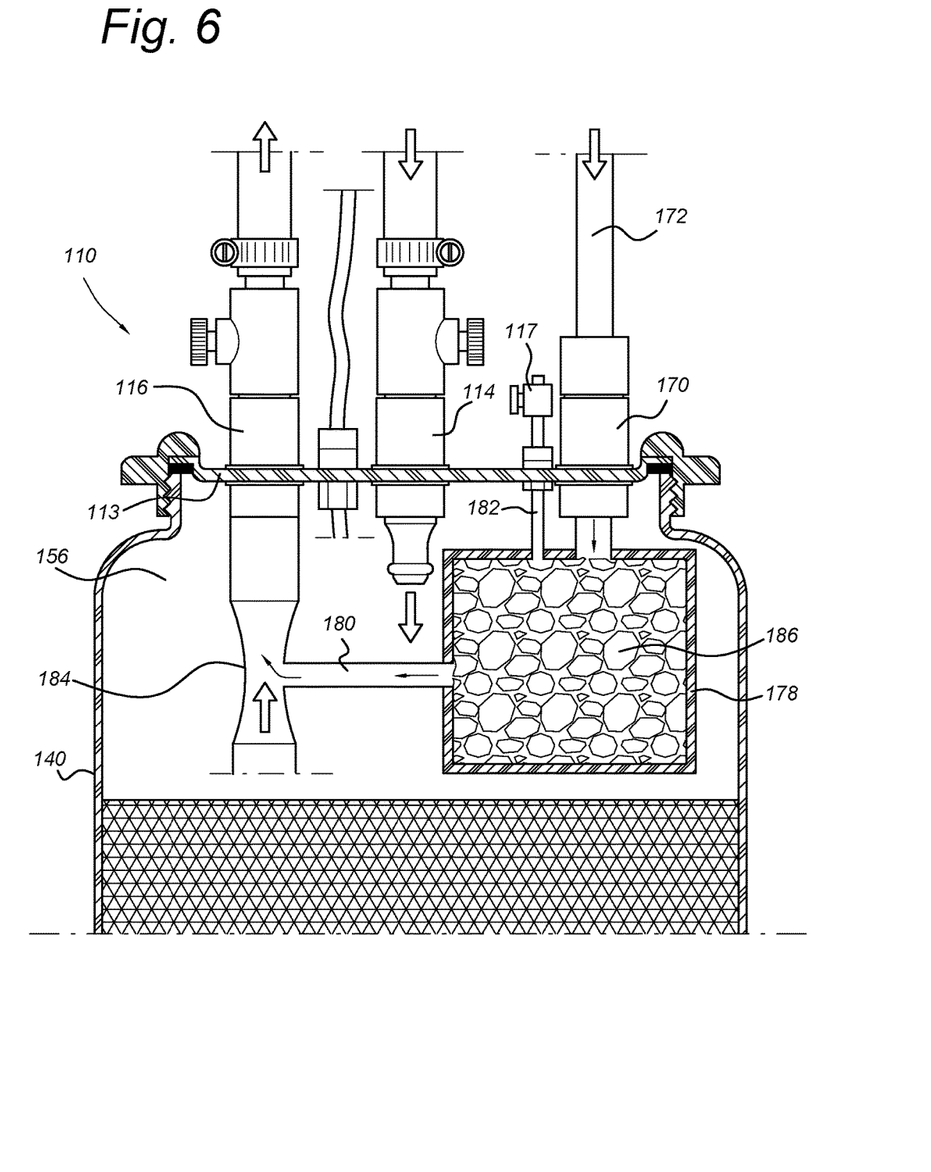
FIG. 6 shows a detail of the upper zone of the filter of FIG. 6.

FIG. 6 shows a detail of the upper zone 140 of the filter 110 of FIG. 5 in cross section. Within the upper zone 140 and below the cover 113 there is provided an additional anaerobic filter chamber 178, communicating with the anaerobic inlet 170. A distribution arrangement, not shown may ensure that water from the anaerobic inlet is distributed to the whole anaerobic filter chamber 178. The anaerobic filter chamber 178 also has an anaerobic outlet 180 and a vent passage 182 in communication with vent 117. The filter 110 of the second embodiment also differs from that of the first embodiment in that a venturi element 184 is provided between the pump outlet 148 and the filter outlet 116. The anaerobic outlet 180 is connected to the venturi element 184. The anaerobic filter chamber 178 is an enclosed space, separate from the header space 156 in which a quantity of porous media 186 is contained. Due to the anaerobic conditions prevailing in the anaerobic filter chamber 178, the porous media 186 is able to maintain a healthy culture of anaerobic denitrifying bacteria.

As discussed above, the aerobic bacteria present on the first, second and third substrates, are only capable of partly completing the nitrogen cycle by breaking down waste products to form nitrates. In order to complete the cycle, the nitrates must be further broken down in an anaerobic process by anaerobic bacteria. In use, when the pump is operated, an underpressure is formed in the venturi element 184, which draws water from the anaerobic filter chamber 178. This causes oxygen poor water from the bed 6 of the aquarium 1 to be aspirated through the branches 174 of the small bore tube 172 to the anaerobic inlet 170. This flow remains separated from and in parallel to the flow through the inlet tubing 120. The proportion of the flow through the anaerobic filter chamber 178 compared to the flow through the filter inlet 114 will be determined by the aspiration caused by the venturi element 184 and the relative flow resistance of the respective flow paths. It will be understood that appropriate regulators may be provided in the circuits to adjust these values. Furthermore, although the second embodiment uses a venturi to aspirate flow through the anaerobic filter chamber 178, this can also be connected to the inlet side of the pump whereby aspiration takes place directly by the pump.

By providing an additional anaerobic filter chamber 178 in which denitrifying cultures may thrive, the filter 110 can perform the complete nitrogen cycle and no further additional water treatment of the aquarium 1 is required. It will be understood by the skilled aquarist that denitrifying bacteria need feeding and this may require additional sources of CO2 to be added to the aquarium. DeniBalls™ available from AquaMedic and similar proprietary products may be provided for this purpose, either for addition to the aquarium or inserted directly within the anaerobic filter chamber 178. During operation of the filter 110, nitrogen is continuously produced in the anaerobic filter chamber 178 and must be vented periodically through the vent passage 182 and the vent 117.

Thus, the invention has been described by reference to certain embodiments discussed above. It will be recognized that various modifications and alternative forms well known to those of skill in the art, in addition to those described above, may be made to the structures and techniques described herein without departing from the spirit and scope of the invention. Accordingly, although specific embodiments have been described, these are examples only and are not limiting upon the scope of the invention.

The invention claimed is:

1. An aquarium filter comprising:
   a watertight filter housing arranged in use to be purged of air, the housing containing a first coarse filter substrate, a second fine filter substrate and a third porous substrate;
   a filter inlet connected to the filter housing to deliver aquarium water to the housing;
   a filter outlet connected to the filter housing to transport filtered water from the housing to the aquarium, and
   a pump arranged in use to circulate water from the filter inlet, through the first coarse filter and the second fine filter to the outlet, whereby the third porous substrate is arranged such that only a partial flow of water passing through the first and second filter substrates flows through the third porous substrate.

2. The filter according to claim 1, wherein the pump has a pump inlet in fluid communication with a pump inlet chamber and the pump inlet chamber has primary openings exposed to the second filter substrate and secondary openings exposed to the third porous substrate, a flow cross section of the primary openings being greater than a flow cross-section of the secondary openings.

3. The filter according to claim 2, wherein the pump has an outlet connected to the filter outlet.

4. The filter according to claim 3, wherein the pump is located within the pump inlet chamber.

5. The filter according to claim 4, wherein the housing comprises a lower zone in which the third porous substrate and the pump inlet chamber are located, a middle zone in which the second fine filter is located and an upper zone in which the first coarse filter is located.

6. The filter according to claim 5, wherein the pump inlet chamber is located centrally in the lower zone and is surrounded by the third porous substrate and wherein the primary openings are located at an upper side of the pump inlet chamber and the secondary openings are located at a lower side of the pump inlet chamber.

7. The filter according to claim 1, wherein the first coarse filter has a relatively larger cross-sectional area than the filter inlet and the housing further comprises a header space for distributing flow from the filter inlet over the first coarse filter.

8. The filter according to claim 1, wherein the first coarse filter is sized to remove all particles larger than 5 mm.

9. The filter according to claim 1, wherein the second fine filter is sized to remove all particles greater than 0.5 mm.

10. The filter according to claim 1, wherein the third porous substrate comprises a porous stone.

11. The filter according to claim 1, wherein the housing has a flow through area of between 100 $cm^2$ and 4000 $cm^2$.

12. The filter according to claim 1, further comprising an air vent arranged to allow air to be purged from within the housing.

13. The filter according to claim 1, wherein at least the filter inlet has a releasable connector and the filter further comprises a cleaning attachment that can be selectively connected to the releasable connector for cleaning the aquarium.

14. The filter according to claim 1, wherein the filter inlet and/or filter outlet are provided with stopcocks.

15. The filter according to claim 1, arranged such that in use, at least 60% of the flow bypasses the third porous substrate, whereby nitrifying bacteria colonising the third porous substrate are not washed away.

16. The filter according to claim 1, wherein the pump is rated to operate at at least 500/750 liters per hour for a head of 1 m.

17. The filter according to claim 1, further comprising an anaerobic filter chamber having an anaerobic inlet to receive a supply of relatively oxygen poor water from the aquarium at least partially in parallel to a supply of relatively oxygen rich water to the filter inlet and an anaerobic outlet in fluid connection to the pump such that the oxygen poor water is drawn through the anaerobic filter chamber and subsequently mixed with the oxygen rich water.

18. The filter according to claim 17, wherein the anaerobic filter chamber has an additional vent.

19. A method of operating an aquarium filter as defined according to claim 1, whereby prior to use, the filter is purged of air.

20. The filter according to claim 1, wherein
the first coarse filter is sized to remove all particles larger than 2 mm,
the second fine filter is sized to remove all particles greater than 0.1 mm, and
the third porous substrate comprises lava stone.

* * * * *